United States Patent [19]

Osa

[11] Patent Number: 5,308,437
[45] Date of Patent: May 3, 1994

[54] BAND MEMBER FORMING APPARATUS

[75] Inventor: Masayuki Osa, Kobe, Japan

[73] Assignee: Sumitomo Rubber Industries Ltd., Kobe, Japan

[21] Appl. No.: 861,896

[22] PCT Filed: Oct. 31, 1990

[86] PCT No.: PCT/JP90/01399

§ 371 Date: Jul. 31, 1992

§ 102(e) Date: Jul. 31, 1992

[87] PCT Pub. No.: WO92/07710

PCT Pub. Date: May 14, 1992

[51] Int. Cl.⁵ .............................................. B29D 30/24
[52] U.S. Cl. ................................. 156/417; 156/378; 156/414; 249/181
[58] Field of Search ..................... 156/414–420, 156/378; 249/178, 180, 181

[56] References Cited

U.S. PATENT DOCUMENTS

| 3,637,450 | 1/1972 | Bryant ................... 156/415 |
| 3,873,398 | 3/1975 | Yokoo et al. . |
| 3,888,720 | 6/1975 | Habert ................... 156/417 |
| 4,001,070 | 1/1977 | Bell ....................... 156/420 |
| 4,349,406 | 9/1982 | Stalter et al. . |
| 4,510,012 | 4/1985 | Kawaida et al. . |
| 4,859,272 | 8/1989 | Lovell et al. . |

FOREIGN PATENT DOCUMENTS 2216100  8/1974  France .
102331   6/1982  Japan .

Primary Examiner—Geoffrey L. Knable

[57] ABSTRACT

A band member forming apparatus including a rotary drum body having a rotary shaft, a drum driving device for rotating the rotary drum body about the rotary shaft, a plurality of moving members arranged in a peripheral direction of the rotary drum body, and radially and movably mounted to the rotary drum body, drum segments fixedly attached to the respective movable members for forming the outer periphery of the rotary drum, a continuous expansion and contraction device for simultaneously moving the movable members and drum segments in a radial directions of the rotary drum so as to expand and contract the diameter of the rotary drum, and a changer device for changing the continuous expansion and contraction device from an operation state to a suspension state and vice versa.

7 Claims, 4 Drawing Sheets

FIG. 3
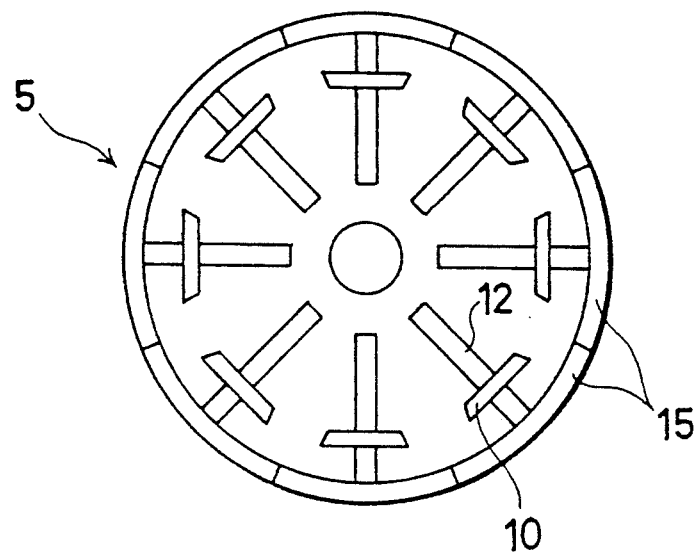
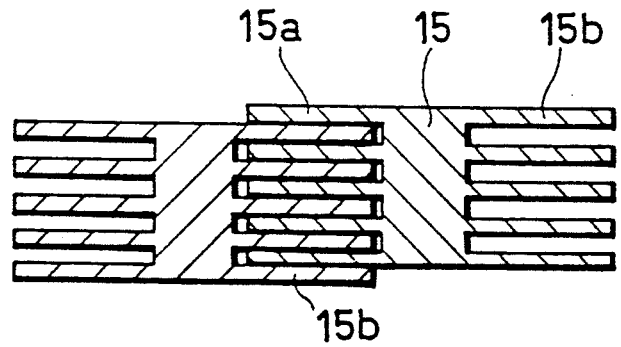
FIG. 4
(a)
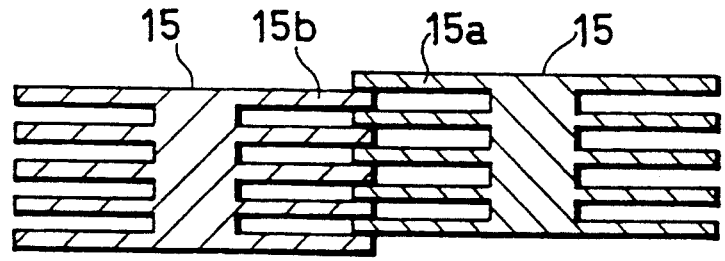
FIG. 4
(b)

BAND MEMBER FORMING APPARATUS

BACKGROUND ART

The present invention relates to a band member forming apparatus in which a tread is adhered on a breaker to form a band member.

In the production of a radial tire or other tire, in general, there has been employed a green tire production method in which a band member (or breaker band) is produced over a special drum in advance by adhering a tread on a breaker, and connected to a toroidal carcass which is formed over another drum.

A band member forming apparatus used in the above method are provided with a rotary drum as shown in FIG. 5 or 6. In the band member forming apparatus 60 shown in FIG. 5, a rotary drum 62 having a drum shaft 61 is made of a plurality of drum segments 63 each of which is in the form of an arc in a side view thereof. In addition, the band member forming apparatus 60 is provided with an air bag 64 in the form of a hollow which is an expansion and contraction means L for moving the drum segments 63 in radial directions. The air bag 64 is placed over the outer periphery of a supporter 66 attached to the drum shaft 61. When the drum is contracted, the air bag 64 is contracted so that the drum segments 63 are withdrawn inside as shown in an upper half portion of FIG. 5. When the air bag 64 is expanded, the drum segments 63 are pushed radially outward so that the outer diameter of the rotary drum 62 is expanded as shown in a lower half portion of FIG. 5. Then, a breaker and a tread are applied over the outer periphery of the rotary drum 62. The drum segment 63 is integrally provided with an engagement portion 67 of which cross section is hook-shaped so as to restrict the amount of the diameter expansion. The engagement portion 67 is engaged with a projection 69 of a restriction ring 68 to restrict the expansion diameter amount x.

A band member forming apparatus 70 shown in FIG. 6 is provided with air cylinders 71 as an expansion and contraction means in place of the air bag 64. The number of air cylinders 71 is the same as that of drum segments 72. In this case, the expanded length of the air cylinder 71 is considered as an expansion amount of the drum diameter. Furthermore, the band member forming apparatus 70 is provided with a restriction block 74 so as to keep a predetermined expansion length. An expansion length x defined by the restriction block 74 is considered as the expansion amount of the drum diameter.

In FIGS. 5 and 6, the breaker and tread are indicated at 75.

FIG. 7 is a diagram showing the positions of the drum segments 63 (72) when viewed in a direction of an arrow A of FIGS. 5 and 6. There is shown the positions of the drum segments 63 (72) at the time of contraction and expansion in upper and lower half portions of FIG. 7, respectively. As seen from FIG. 7, in the conventional apparatus, a peripheral surface is, at the time of contraction, formed with respective longitudinal end edges of the drum segments 63 (72) kept in contact with one another. On the other hand, at the time of expansion, a space a exists between the drum segments 63 (72) adjacent to each other.

According to the conventional apparatus, it is required to use the restriction ring 68 or restriction block 74 in order to keep the predetermined expansion diameter amount x. Moreover, it is necessary to provide variously sized restriction rings 68 or restriction blocks 74 for different kinds of tire. Furthermore, every time the diameter of a tire is changed, the restriction ring 68 or restriction block 74 should be replaced. Consequently, management of parts and preparatory working are complicated.

Furthermore, the air bag 64 or air cylinder 71 has a limited effective stroke. In the case where a tire having a greater size than the limited effective stroke is to be formed, it is required to use a rotary drum provided with expansion and contraction means having a greater effective stroke.

In the conventional apparatus, the spaces a exist between the drum segments at the time of expansion. Accordingly, a band-like material such as a breaker is likely to come into a polygonal form when applied over the rotary drum, which consequently causes an undesirable quality.

SUMMARY OF THE INVENTION

To solve the above drawbacks, the following construction is employed in the present invention.

A band member forming apparatus of the present invention comprising a rotary drum body having a rotary shaft, drum driving means for rotating the rotary drum body about the rotary shaft, a plurality of movable members arranged in a peripheral direction of the rotary drum body and radially movably mounted to the rotary drum body, drum segments fixedly attached to the respective movable members for forming the outer periphery of the rotary drum, continuous expansion and contraction means for simultaneously moving the movable members and drum segments in radial directions of the rotary drum so as to expand and contract the diameter of the rotary drum, and changer means for changing the continuous expansion and contraction means from an operation state to a suspension state and vice versa.

With the above construction, the continuous expansion and contraction means is first changed to the operation state and all the movable members and drum segments are moved in radial directions simultaneously. When the drum segments reach an appropriated position, the continuous expansion and contraction means is changed to the suspension state and the diameter of the rotary drum is set at an arbitrary application diameter at which the rotary drum is rotated to form a band member. In other words, the application diameter of the rotary drum can be continuously adjusted and set at an arbitrary diameter without using different kinds of restriction blocks or restriction rings.

BRIEF DESCRIPTION OF THE DRAWINGS

FIG. 3 is a diagram showing an arrangement of drum segments when viewed in a direction of an arrow Z in FIG. 1;

FIGS. 4(a) and (b) are diagrams illustrated positional relationships between drum segments at the time of contraction and expansion of the rotary drum;

BEST MODE OF CARRYING OUT THE INVENTION

Figure 1:
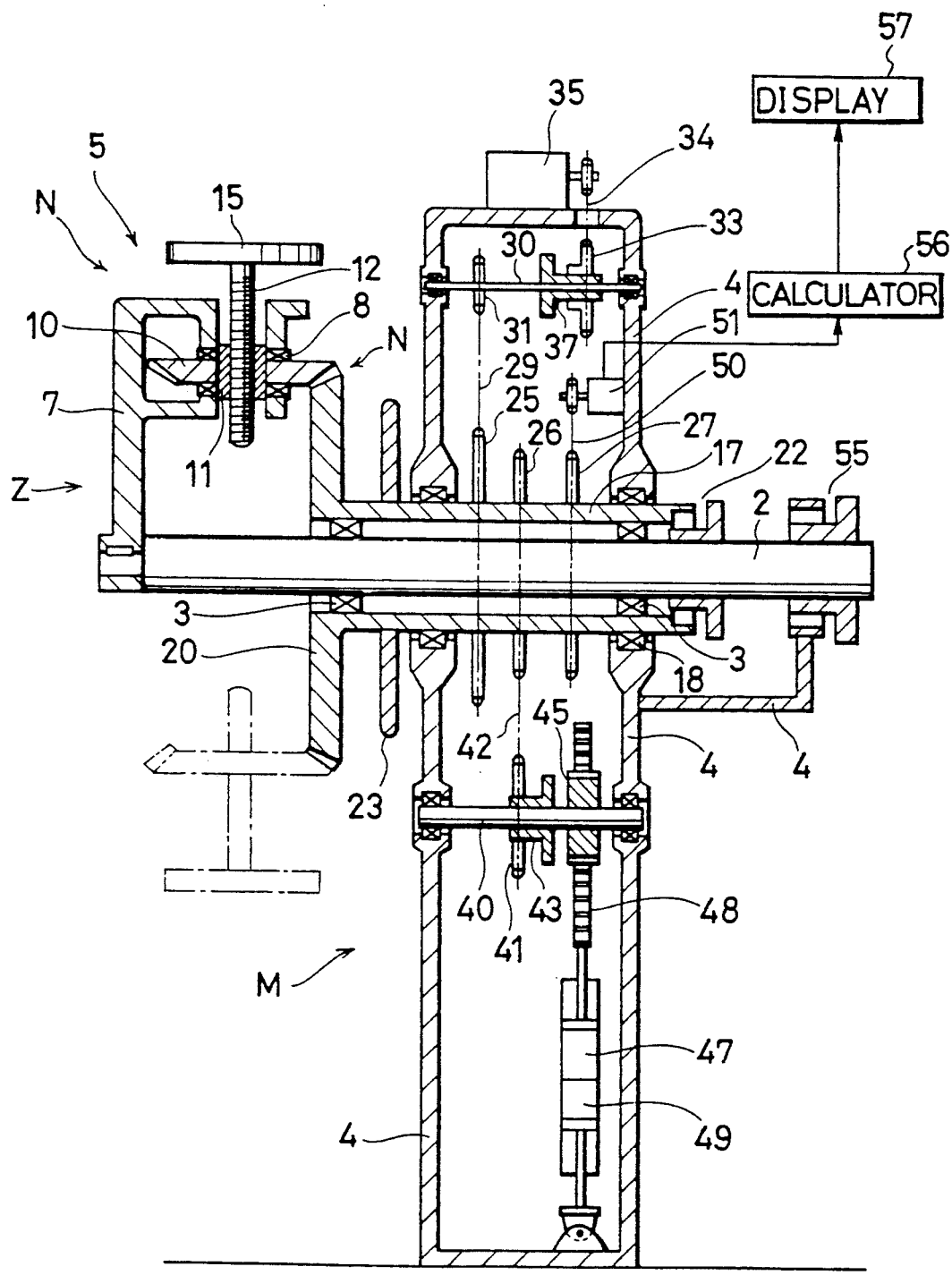
FIG. 1 is a section view of a band member forming apparatus of one embodiment of the present invention.

There will be described one embodiment of the present invention with reference to FIGS. 1 to 4.

A band member forming apparatus 1 comprises a rotary drum 5. The rotary drum 5 includes a drum shaft (rotary shaft) 2 and a housing (a rotary drum body) 7. The drum shaft 2 is supported on a frame 4 by way of a hollow shaft 17, to be described below, and bearings 3 and 18. The housing 7 is rotated together with the drum shaft 2. A plurality of small bevel gears (eight small bevel gears in this embodiment) 10 are provided in an outer peripheral portion of the housing 7 by way of bearings 8. A screw cylinder 11 is fixedly attached to an inside wall of the small bevel gear 10. A threaded through hole is formed in the center of the screw cylinder 11. The threaded through hole of the screw cylinder 11 is engaged with a screw rod (moving member) 12.

Various screws having forms other than a trapezoidal screw or ball screw can be used for the screw form of the screw cylinder 11 and screw rod 12.

The screw rod 12 has a drum segment 15 provided on a tip portion thereof. As shown in FIGS. 4(a) and (b), the drum segment 15 has end portions 15a and 15b which are formed into a comb shape. The end portion 15a(15b) of one drum segment 15 is entirely engaged with the end portion 15b(15a) of another drum segment 15 adjacent to the one drum segment 15 in a peripheral direction so as to form the outer periphery of the rotary drum 5.

The hollow shaft 17 is rotatably provided around the drum shaft 2 by way of the bearing 3 coaxially with the drum shaft 2. Also, the hollow shaft 17 is rotatably supported on the frame 4 by way of the bearing 18 independently of the drum shaft 2. The hollow shaft 17 has a large bevel gear 20 formed on an end thereof. The single large bevel gear 20 is engaged with all the small bevel gears 10. The hollow shaft 17, large bevel gear 20, small bevel gears 10 and screw cylinders 11 constitute continuous expansion and contraction means N for moving the screw rod 12 and drum segments 15 simultaneously.

A clutch (changer means) 22 is provided between the drum shaft 2 and hollow shaft 17. When the clutch 22 is released, the shafts 2 and 17 are rotated independently of each other. When the clutch 22 is locked, the shafts 2 and 17 are rotated together with each other.

Figure 2:
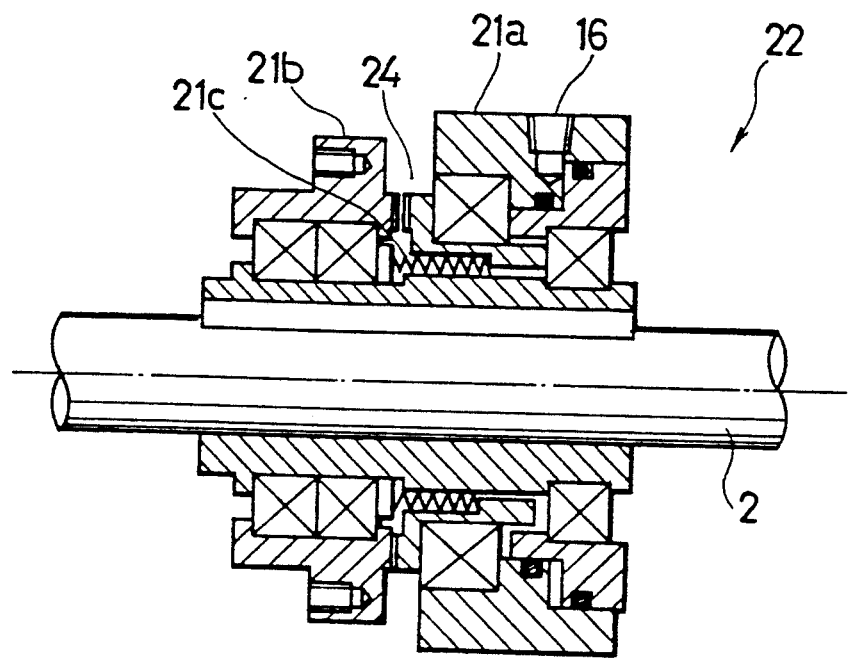
FIG. 2 is a section view of a clutch provided in the apparatus.

As shown in FIG. 2, the clutch 22 has an idle member 21a. The idle member 21a can be moved in the same direction as that of the drum shaft 2 relative to a body fixedly attached to the drum shaft 2. A connector 21b is fixedly attached to the hollow shaft 17. The connector 21b is engaged with the idle member 21a by means of engaging teeth. The idle member 21a and the body are formed with engaging teeth 24 respectively. The engaging teeth 24 can be engaged with each other. The idle member 21a is usually held by the force of a compression spring 21c in a state in which the engaging teeth 24 are separated from each other (a state shown in an upper half portion of FIG. 2). When the air is supplied into the clutch through an air hole 16, the air pressure causes the idle member 21a to move against the force of the spring 21c. In addition, the engaging teeth 24 are engaged with each other (in a state shown in a lower half portion of FIG. 2) to transmit the torque.

There will be described a drive mechanism for the rotary drum 5 with reference to FIG. 1. The frame 4 has upper and lower intermediate shafts 30 and 40 rotatably provided inside thereof. The intermediate shafts 30 and 40 are parallel with the hollow shaft 17. The upper intermediate shaft 30 has a sprocket 31 directly attached thereto and a sprocket 33 attached thereto by way of a clutch 37. When the clutch 37 is locked, the sprocket 33 is rotated together with the intermediate shaft 30. When the clutch 37 is released, the sprocket 33 is rotated independently of the intermediate shaft 30.

On the other hand, sprockets 25, 26 and 27 are provided on the outer periphery of the hollow shaft 17 which is in the frame 4. The sprocket 25 is associated with the sprocket 31 of the intermediate shaft 30 by way of a chain 29. The sprocket 33 of the intermediate shaft 30 is associated with an output shaft of a motor (drum driving means) 35 by way of a chain 34. The motor 35 is provided on the frame 4. When the clutch 37 is locked, the torque of the motor 35 is transmitted to the hollow shaft 17 by way of the chain 34, clutch 37, sprocket 33, intermediate shaft 30, sprocket 31, chain 29 and sprocket 25 (which constitute a driving transmission mechanism), so that the hollow shaft 17 is rotated. When the clutch 37 is released, the hollow shaft 17 is rotated independently of the motor 35.

The sprocket 27 is associated with a rotary member of a pulse generator 51 by way of a chain 50. The pulse generator 51 is fixedly attached to an inner side wall of the frame 4 and sends a pulse signal to a calculation unit 56 (which constitutes display means). The pulse signal sent from the pulse generator 51 corresponds to a rotational amount of the sprocket 27 (i.e., a rotational amount of the hollow shaft 17) which is transmitted by way of the chain 50. The calculation unit 56 counts the number of pulses of the pulse signal. Subsequently, the radial displacement of the drum segment 15, i.e., the outer diameter of the rotary drum 5 is calculated from the counted pulse number. The outer diameter thus calculated is displayed in a display unit 57 (which constitutes display means).

Next, there will be described expansion and contraction adjustment means M. The expansion and contraction adjustment means M is adapted for contracting the rotary drum 5 to remove the formed band member and expanding the formed band member, and expanding the rotary drum 5 to give additional tension to the formed band member.

The intermediate shaft 40 has a pinion gear 45 fixedly attached thereto and a sprocket 41 attached thereto by way of a clutch 43. When the clutch 43 is locked, the torque of the sprocket 41 is transmitted to the intermediate shaft 40. When the clutch is released, the torque of the sprocket 41 is not transmitted to the intermediate shaft 40. The sprocket 41 is associated with the sprocket 26 on the hollow shaft side 17 by way of a chain 42.

On the other hand, air cylinders 47 and 49 are serially arranged in a lower portion of the frame 4 with being faced in opposite directions. The lower air cylinder 49 has a piston rod connected to the frame 4. The upper air cylinder 47 has a piston rod fixed to a rack gear 48. The rack gear 48 is engaged with the pinion gear 45.

A clutch 55 is provided between the drum shaft 2 and the frame 4. When the clutch 55 is locked, the drum shaft 2 is fixedly connected to the frame 4. When the clutch 55 is released, the drum shaft 2 can be rotated.

Next, there will be described steps of forming a band member such as a breaker band by use of the above-mentioned apparatus. The forming steps are divided broadly into a process of adjusting and setting the diameter of the rotary drum and a process of applying materials over the rotary drum.

i) Process of adjusting and setting the diameter of the rotary drum

First, the clutch 55 is locked to fix the drum shaft 2 to the frame 4. On the other hand, the clutches 22, 37 and 43 are released so that the hollow shaft 17 can be rotated independently of the drum shaft 2, motor 35 and intermediate shaft 40. The piston of one of the cylinders 47 and 49 is projected and that of the other cylinder is contracted.

Then, a hand wheel 23 is manually rotated to rotate the hollow shaft 17. This torque is converted into a driving force for the axial movement of the screw rod 12 by way of the large bevel gear 20, small bevel gears 10 and screw cylinders 11. Consequently, all the drum segments 15 are moved in radial directions (moved inward or outward), so that the diameter of the rotary drum 5 is changed.

During this operation, the change of the diameter of the rotary drum is calculated by the calculation unit 56 which receives a detecting signal from the pulse generator 51, and then displayed in the display unit 57. The calculation are executed as set forth hereinbelow.

In an initial state, if the reference diameter is D0, lead of the screw (an advancing amount of the screw per revolution) is l, gear ratio of the large bevel gear 20 to the small bevel gear 10 is R1, the number of revolutions of the hollow shaft 17 is m and sprocket ratio of the pulse generator 51 to the hollow shaft 17 is 1, an actual drum diameter (segment diameter) D1 is expressed by the following equation:

$$D1 = D0 - 2 \ (l \cdot R1 \cdot m) \quad (1)$$

If the pulse generator generates n pulses per revolution and the actually counted pulse number is N, the following equation can be expressed:

$$N = m \cdot n \quad (2)$$

Equations (1) and (2) are combined at the common variable m to produce an equation which makes it possible to calculate an actual segment diameter D1 based on the pulse number N. The segment diameter D1 and pulse number N calculated by the calculation unit 56 are displayed in the display unit 57.

The operator carries out the adjusting operation seeing the displayed segment diameter. When the segment diameter reaches a desired diameter, i.e., the application diameter, the rotation of the hand wheel 23 is stopped. In this state, the clutch 22 is locked and the hollow shaft 17 is fixed to the drum shaft 2. Consequently, the drum segments 15 cannot be moved relative to the housing 7 of the rotary drum 5, so that the desired application diameter can be held.

ii) Process of applying materials over the rotary drum

As mentioned above, after the application diameter is set, the clutch 55 is released to allow the drum shaft 2 and hollow shaft 17 to rotate relative to the frame 4. The clutch 37 is locked to allow the drum shaft 2 to rotate together with the hollow shaft 17 by the torque of the motor 35. In this state, when the motor 35 is driven, the drum segments 15 are rotated together with the housing 7 but the drum shaft 2 cannot be rotated relative to the hollow shaft 17. Consequently, a relative movement does not occur between the large bevel gear 20 and small bevel gears 10 and the drum diameter is then neither expanded nor contracted.

In this state, also, the pulse generator 51 is electrically disconnected from the calculator unit 56 so that the pulse number is not counted. The application diameter set by the above process is stored. The breaker and tread are applied over the drum segments 15 to form a band member while the rotary drum 5 is being rotated by the torque of the motor 35.

Figure 7:
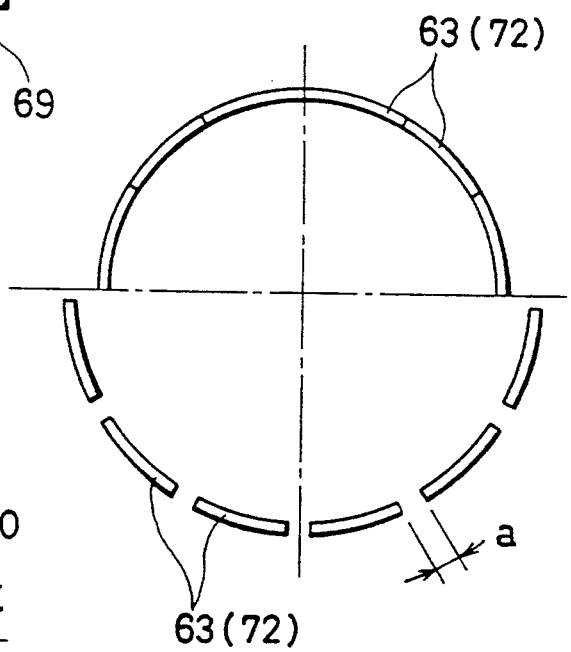
FIG. 7 is a diagram showing arrangements of drum segments when viewed in a direction of an arrow A in FIGS. 5 and 6.
Figure 6:
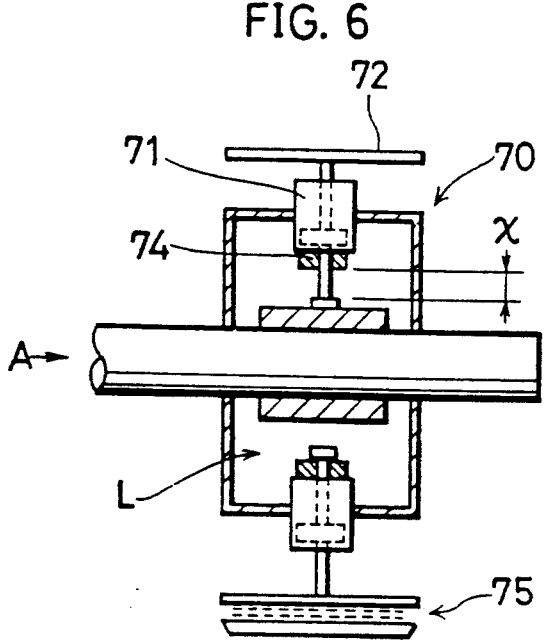

Although the diameter of the rotary drum 5 is expanded, the respective end portions 15a and 15b of the drum segments 15 are in the engagement position as shown in FIG. 4 (b). Unlike the conventional construction shown in FIG. 7, there is not any space a. Accordingly, there is not any likelihood that the outer periphery of the rotary drum 5 has a polygonal form. Consequently, the band member can be smoothly formed and its quality can be improved.

When removing the formed band member, (a) the clutch 55 is locked to fix the drum shaft 2 relative to the frame 4, (b) the clutches 22 and 37 are released to allow the hollow shaft 17 to rotate independently of the drum shaft 2, and (c) the clutch 43 is locked.

In this state, the projected piston rod of the air cylinder 47 or 49 of the expansion and contraction adjustment means M is contracted. The vertical movement of the rack gear 48, which is caused by the contraction of the piston rod, is transmitted to the hollow shaft 17 by way of the pinion gear 45, intermediate shaft 40, clutch 43, sprocket 41, chain 42 and the sprocket 26 (which constitute the drive transmission mechanism). The revolution of the hollow shaft 17 is transmitted to the drum segments 15 by way of the large bevel gear 20, small bevel gears 10, screw cylinders 11 and screw rods 12, and the drum segments 15 are moved inward. Consequently, the outer diameter of the rotary drum 5 is contracted to a diameter enabling the band member to be removed.

In this case, it is sufficient to contract the rotary drum 5 to a diameter which merely allows the removal of the formed band member (breaker-tread band) to be removed from the rotary drum 5, preferably, 10 to 20 mm. The amount of contraction can be arbitrarily set by changing the cylinder stroke of the cylinders 47 and 49, gear ratio of the rack gear 48 to the pinion gear 45, and ratio of the sprocket 41 to the sprocket 26. One example of the calculation is as follows.

(the amount of expansion and contraction) = $(s/r0) \cdot R1 \cdot R2 \cdot l$ s: cylinder stroke
r0: pitch circumference of the pinion gear
R1: bevel gear ratio
R2: sprocket ratio
l: lead of the screw rod After forming the band member, there may be the necessity of expanding the diameter of the band member to give additional tension in order to discharge the air left in the breaker or to eliminate partial sag which is caused by unevenness of applying tension. In this case, the expansion and contraction adjustment means M is useful. Specifically, under the same condition as the removal operation, the piston rod of the contracted air cylinder 47 (49) is projected to move the drum segment 15 further outward and increase the outer diameter of the rotary drum 5. Consequently, a proper tension can be given to the band member positioned on the outside surface thereof. When removing the band member after the further expansion, the reverse operations are performed to decrease the diameter of the rotary drum 5.

It should be noted that the present invention is not limited to the above-mentioned embodiments, for example, there may the following ways.

(1) In the above embodiment, a worker manually operates the hand wheel 23 seeing the display unit 57 to adjust the application diameter. However, adjustment of the application diameter may be automatically performed by use of an appropriate device.

Figure 8:
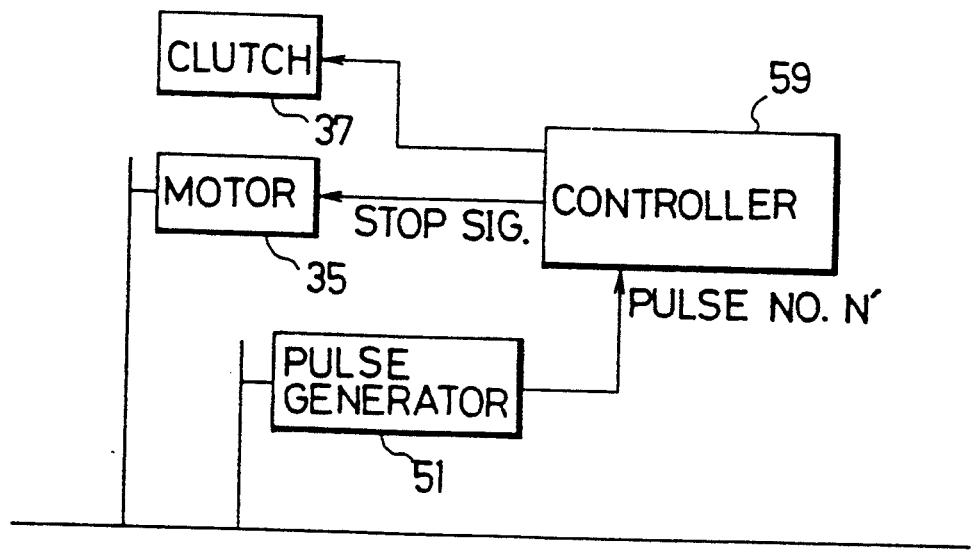
FIG. 8 is a block diagram showing an operation of adjusting the diameter of an applied material automatically.
Figure 5:
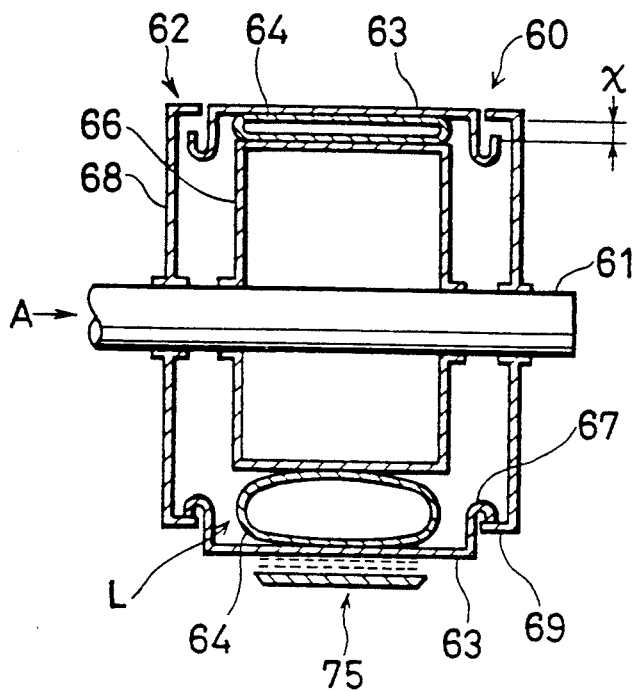
FIGS. 5 and 6 are section views of conventional band member forming apparatus.

FIG. 8 is a block diagram showing a construction which enables automatic adjustment of the application diameter. In the drawing, a controller 59 receives the pulse signal from the pulse generator 51. Also, in the controller 59 is set in advance a pulse number NO corresponding to a desired application diameter. In the adjustment of the drum diameter, first, the controller (control means) 59 locks the clutch 37 and at the same time allows the motor 35 to rotate and then the hollow shaft 17 to rotate to change the diameter of the rotary drum 5. Also, the controller 59 counts the number N′ of pulses of the pulse signal from the pulse generator 51. When the pulse number N′ becomes equal to the preset pulse number NO, the controller 59 releases the clutch 37 to stop the motor 35.

With this construction, the diameter of the rotary drum 5 can automatically be adjusted by the controller 59. In addition, the motor 35, which is adapted for driving the rotary drum 5, is used as drive means for the adjustment of the drum diameter. Accordingly, the adjustment can be executed by a smaller construction and at a low cost. In place of such combined use, however, it may be appropriate to provide another drive means for the adjustment of the drum diameter, i.e., drive means for the continuous expansion and contraction means N separately. In the construction of FIG. 1, there may be provided a motor similar to the motor 35 a drive shaft of which is connected to the hollow shaft 17 by way of a clutch.

(2) In this apparatus, without using the expansion and contraction adjustment means M, only by use of the continuous expansion and contraction means N, the rotary drum can be contracted to the diameter at which the formed band member is removed, and expanded to the diameter at which additional tension is given to the formed band member. Specifically, a pulse number corresponding to a fine adjustment of the drum diameter is calculated in advance. The hollow shaft 17 is rotated relative to the drum shaft 2 by driving the motor 35 in accordance with the calculated pulse number. However, it will be seen that the use of the above-mentioned expansion and contraction adjustment means M makes the fine adjustment easier.

(3) In the above-mentioned embodiments, the hollow shaft 17 is coaxially arranged around the drum shaft 2, and is formed with the large bevel gear 20 on the end portion thereof. However, the present invention does not limit to such construction. It may be appropriate to employ a construction in which a separate large bevel gear 20 may be rotatably provided on the drum shaft 2 by a way of a clutch, and be rotated independently of the drum shaft 2 by releasing the clutch, and be rotated together with the drum shaft 2 by locking the clutch.

(4) According to the present invention, the changer means is not limited to the above specific construction, and may be constituted by various clutches other than the air clutch or means other than clutches. For example, the hollow shaft 17 is attached to the drum shaft 2 by use of a bolt. When the drum diameter is adjusted, i.e., the continuous expansion and contraction means N is operated, the bolt is loosened to allow the hollow shaft 17 to rotate independently of the drum shaft 2. After the adjustment, the bolt is tightened to allow both drum shaft 2 and hollow shaft 17 to rotate together with each other.

(5) In the above embodiments, the drum diameter is displayed by the display unit 57. If the operator knows the relationship between the drum diameter and the pulse number, the pulse number may be directly displayed.

(6) The present invention is not limited to such forming of breaker band as mentioned above, but is broadly applied to forming of other various band members.

INDUSTRIAL EXPLOITABILITY

As described above, the present invention is useful as an apparatus for forming a band member, in particular, as an apparatus for forming breaker band by applying a breaker and a tread for tire. The diameter of a rotary drum can be adjusted in non-stage or continuously. The adjusted diameter can be held. Accordingly, various kinds of band member having different diameters can be formed easily without using conventional restriction blocks or restriction members.

What is claimed is:

1. A band member forming apparatus comprising:
a drum shaft;
a drum body integrally connected with the drum shaft;
a rotary member coaxially provided on the drum shaft, the rotary member including a large bevel gear;
driving means for rotating the rotary member;
changer means provided between the drum shaft and the rotary member, and adapted for selectively setting the drum shaft in a stationary state of being stationary or in a rotational state of rotating together with the rotary member; and
a plurality of drum segment devices carried on the drum body and arranged in a circumferential direction of the drum body, each said device including:
a drum segment for constituting a material application drum together with the drum segments of the other said devices;
a radially movable member carrying the drum segment, the radially movable member including a screw rod; and
a mechanical converter operationally associated with the rotary member, the mechanical converter including a small bevel gear rotatably mounted on the drum body, and meshed with the large bevel gear, and formed with a threaded hole in a center thereof, the screw rod extending through the threaded hole,
the mechanical converter converting the rotation of the rotary member into the radial movement of the radially movable member when the drum shaft is in the stationary state while not converting the rotation of the rotary member into the radial movement of the radially movable member when the drum shaft is in the rotational state.

2. The band member forming apparatus according to claim 1 wherein:

the rotary member further includes a hollow cylinder shaft integrally connected to the large bevel gear, and coaxially provided around the drum shaft; and the changer means includes a clutch provided between the hollow cylinder shaft and the drum shaft.

3. The band member forming apparatus according to claim 1 wherein the driving means includes a main driving system having a motor and a transmission mechanism for transmitting a driving force of the motor to the rotary member.

4. The band member forming apparatus according to claim 3 wherein the driving means further includes a secondary driving system having at least one cylinder provided with an expandable piston rod, and a converting mechanism for converting the expansion of the piston rod to a rotation of the rotary member.

5. The band member forming apparatus according to claim 1 wherein the plurality of drum segments each have comb-shaped end portions engageable with end portions of adjacent ones even when the plurality of drum segments are moved to a maximum outer position.

6. The band member forming apparatus according to claim 1 further comprising:
   detector means for detecting a moving amount of the drum segments;
   calculator means for calculating an outer diameter of the material application drum based on the detected moving amount; and
   display means for displaying the calculated outer diameter.

7. The band member forming apparatus according to claim 1 further comprising:
   detector means for detecting a moving amount of the drum segments; and
   controller means responsive to the detector means for controlling the driving means based on the detected moving amount so that the material application drum expands to a predetermined outer diameter.

* * * * *